March 12, 1940. H. W. GROTE Re. 21,390
PROCESS OF FORMING AGGLOMERATED CARBON BLACK
Original Filed Aug. 22, 1933
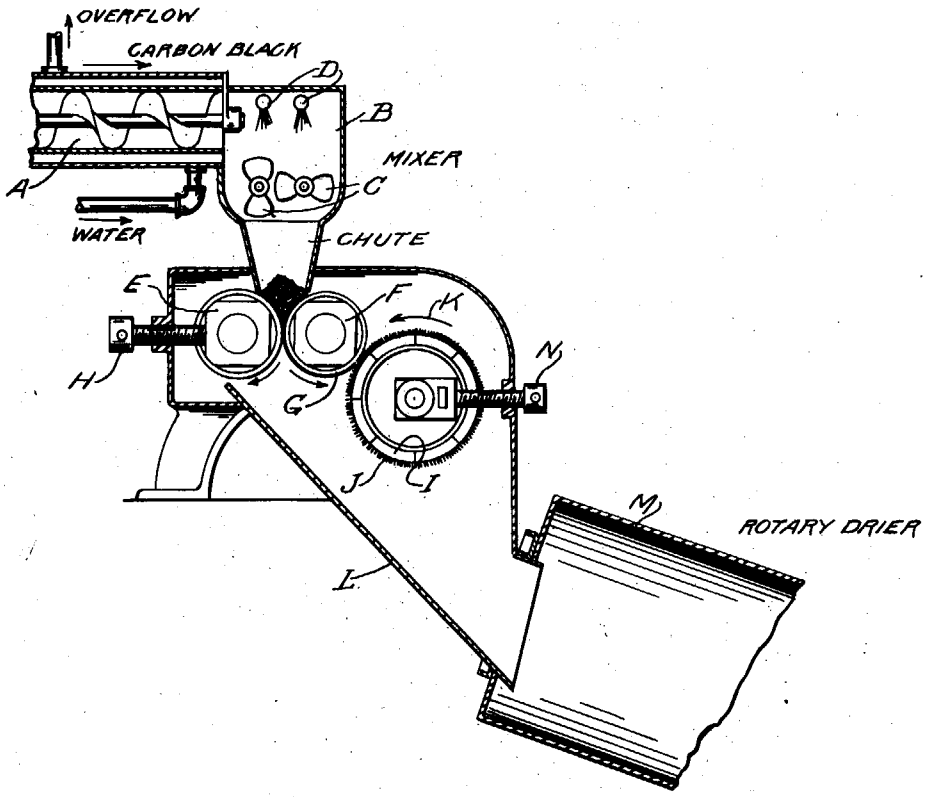
INVENTOR.
H. W. Grote
BY Foster & Codier
ATTORNEYS.

Reissued Mar. 12, 1940

Re. 21,390

UNITED STATES PATENT OFFICE 21,390

PROCESS OF FORMING AGGLOMERATED CARBON BLACK

Hans Walter Grote, New York, N. Y., assignor to United Carbon Company, Inc., Baltimore, Md., a corporation of Maryland Original No. 2,040,770, dated May 12, 1936, Serial No. 686,311, August 22, 1933. Application for reissue September 27, 1937, Serial No. 165,943

10 Claims. (Cl. 134—60)

The present invention relates to the production of agglomerates or shaped masses of carbon black, for the purpose of overcoming some of the objectionable properties of raw carbon black, such as the formation of dust, during the handling of the same, during the mixing of the same with rubber or other materials, and for producing a product which is easier to handle. As is well known, carbon black in its original form is a powdery or more or less lumpy material constituted of extremely small particles, so that during the handling of the same, air currents may blow the same about to some extent, and the object of the present invention is to produce agglomerates which will be free from the said objection.

In accordance with the present invention, the carbon black is moistened with a volatile liquid, e. g., alcohol, benzol, gasoline, methanol and acetone, but for which purpose water is entirely suitable, the mass is stirred and kneaded, to form a rather stiff paste, which is friable in character. The said paste is then worked upon an ordinary roller mill, for example a mill consisting of two horizontal rollers rotating in a vertical plane, the rollers may be operated at slightly different surface speeds, in order to cause the roll-milled material to adhere to one of the rollers, as a compacted layer. When this has been accomplished, another roller carrying needles or other points of similar character is rotated in such a position that the needles will scratch off the material on the roller, thereby producing shaped masses of the carbon black, which are then subjected to a high temperature drying operation, preferably at a temperature very much above the boiling point of the wetting agent employed.

The dried material so produced can then be passed over a series of sieves in order to separate the same into different sizes, as required for different particular purposes for which the carbon black is to be employed.

For carrying out the process of the present application, an apparatus can be employed such as is shown diagrammatically in the annexed drawing, the figure representing a sectional elevation of suitable apparatus. It is to be understood however that this apparatus is shown merely for the purpose of illustration, and not as limiting the scope of the invention thereto.

In carrying out the process of the present invention, the carbon black may be fed through a conveyor A, which may be water-jacketed if desired for cooling purposes, the carbon black falling into the mixer B which may be a trough-shaped device, having agitators also acting as propellers C. Jets of a suitable vapor or liquid or mist are directed upon the material from the spayers or perforated pipes D, and the proportion of the liquid used should be such as to give a very friable relatively dry pasty mass, in the mixer B.

From the bottom of the mixer B, the pasty mass is discharged through the chute illustrated, or in any other manner, into the space between the rolls of a roller mill, shown at E and F. These rolls rotate, in the direction of the arrows shown, the peripheral speed of one roller may be slightly greater than that of the other so that the moistened carbon forms in a layer G, upon the roller F. The thickness of this layer will be regulated by the space between the two rollers, this being adjustable by means of a screw shown conventionally at H.

At I is shown a rapidly rotating roller, which can rotate for example in the direction shown by the arrow K, the surface of the roller carrying a great number of small needle-shaped spikes J. These needles, which are distributed over the entire face of the roller I, scratch off the layer or cake of compressed moistened carbon from the surface of the roller F, this then flowing down through the chute L, into the upper end of a rotary drier M, in which the material is dried by being subjected to gases at a high temperature, say 400 to 500° F. in order to rapidly dry the same, and leave the desirable porous friable structure of the finished material.

The roller I should be situated near enough to the roller F so that the needles will scrape off substantially the whole of the layer of carbon therefrom, the position of said roller being adjusted by means of a screw shown at N, or otherwise. The closeness together of the needles J will regulate the size of the particles torn off in this manner, which particles will of course be of more or less irregular shape.

After the drying operation the granular material can be passed over a series of sieves, to separate the same into different particle sizes, and any particles which are too small for use, as well as any particles which are too large for use, can be reintroduced through the conveyer A into the mixer B.

The particle size will be in part regulated by the thickness of the layer G on the roller F, and for ordinary purposes I find that this layer can be from a sixteenth of an inch in thickness to a quarter of an inch, but I do not restrict myself to these limits. If any of the moistened carbon is left on the roller F, after passing the roller I, this does no particular harm and will bond with a subsequently applied layer of the paste, to be scratched off during a subsequent rotation of the roller.

The proportion of water or other liquid introduced into the carbon black in the mixer B is subject to variation, and for ordinary purposes I find that about 40% of moisture is very satisfactory. This figure however is given merely by way of illustration without restricting the invention thereto.

I claim:

1. The process of converting finely divided and dusty carbon black into a product which is substantially dustless, comprising moistening carbon black with a volatile liquid, forming a thin sheet of the moistened carbon black, subdividing said sheet into small irregularly shaped masses of carbon black agglomerates and drying the said masses, whereby a granular product is formed which is substantially dustless.

2. The process of converting finely divided and dusty carbon black into a product which is substantially dustless, comprising moistening the carbon black with water to form a stiff, pasty mass, forming a compressed sheet of the mostened carbon black, subdividing said sheet into small irregularly shaped masses of carbon black agglomerates and drying the said masses, whereby a granular product is formed which is substantially dustless.

3. The process of converting finely divided and dusty carbon black into a product which is substantially dustless, comprising moistening carbon black with water, the amount of water being about 40% of the moistened mass, forming a compressed thin sheet of the moistened carbon black, subdividing said sheet into small irregularly shaped masses of carbon black agglomerates and drying the said masses, whereby a granular product is formed which is substantially dustless.

4. The process of converting finely divided and dusty carbon black into a product which is substantially dustless, comprising moistening carbon black with a volatile liquid, forming a thin sheet of the moistened carbon black, subdividing said sheet into small irregularly shaped masses of carbon black agglomerates, and subjecting the said masses to temperatures within the range of approximately 400° to 500° F. while agitating the masses by a rotary tumbling motion to thereby dry the masses as shaped porous, friable granules of substantially dustless carbon black.

5. The process of converting finely divided and dusty carbon black into a product which is substantialy dustless, comprising moistening the carbon black with water to form a stiff, pasty mass, forming a compressed sheet of the moistened carbon black, subdividing said sheet into small irregularly shaped masses of carbon black agglomerates, and subjecting the said masses to temperatures within the range of approximately 400° to 500° F. while agitating the masses by a rotary tumbling motion to thereby dry the masses as shaped porous, friable granules of substantially dustless carbon black.

6. The process of converting finely divided and dusty carbon black into a product which is substantially dustless, comprising moistening carbon black with a volatile non-solvent wetting agent and working the mass to form a friable relatively dry paste, subjecting the wetted mass to roll milling to form said paste into a compacted layer of wetted carbon black agglomerates, breaking said layer to form small, irregularly shaped agglomerates therefrom, and thereafter drying the said small irregularly shaped agglomerates at temperatures within the range of approximately 400° to 500° F., whereby substantially dry, porous, friable granules of a substantially dustless product are formed.

7. The process of converting finely divided and dusty carbon black into a product which is substantially dustless, comprising moistening the carbon black with water and working the mass to form a stiff paste, subjecting said paste to rolling pressures by a pressure-exerting roller member to compress the mass and form a sheet-like compacted layer therefrom, breaking said compacted sheet-like layer into small shaped masses of wetted carbon black agglomerates, and thereafter drying the said small shaped masses of wetted carbon black at temperatures within the range of approximately 400° to 500° F. while agitating the masses by a rotary tumbling motion, whereby a substantially dry, porous, friable granular product is formed which is substantially dustless.

8. The process of converting finely divided and dusty carbon black into a product which is substantially dustless, comprising moistening carbon black with approximately 40% by weight of water and working the mass, subjecting the moistened carbon black to rolling pressures by a pressure-exerting roller member to compress the mass and form a sheet-like compacted layer therefrom, breaking said compacted sheet-like layer into small shaped masses of wetted carbon black agglomerates, and thereafter drying the said masses while agitating the masses by a rotary tumbling motion at temperatures within the range of approximately 400° to 500° F., whereby a substantially dry, porous, friable granular product is formed which is substantially dustless.

9. The method of making minute aggregates of carbon black which are substantially devoid of occluded gases, which includes the steps of mixing carbon black and a non-solvent liquid wetting agent to form a pasty mass, forming the pasty mass into a compressed sheet-like layer by subjecting it to rolling pressures by a pressure-exerting roller member, subdividing said layer to form small aggregates thereof, and thereafter drying the said aggregates at temperatures within the range of approximately 400° to 500° F. while subjecting the aggregates to a rotary tumbling motion, whereby a substantially dry, porous, friable granular product is formed which is substantially dustless.

10. The method of making minute aggregates of dustless carbon black, which includes the steps of mixing dry carbon black and a liquid wetting agent to form a pasty mass, rolling the mass with a pressure-exerting roller member to form a sheet-like layer therefrom, subdividing said layer to form small aggregates of the carbon black and liquid, and thereafter drying said aggregates by removing the liquid wetting agent at temperatures within the range of approximately 400° to 500° F. while subjecting the aggregates to a rotary tumbling motion, whereby substantially dry, porous, friable granular dustless particles of carbon black are produced.

HANS WALTER GROTE.